US008638942B2

(12) United States Patent
Maeda et al.

(10) Patent No.: US 8,638,942 B2
(45) Date of Patent: Jan. 28, 2014

(54) METHOD AND SYSTEM FOR MANAGING SHARED RANDOM NUMBERS IN SECRET COMMUNICATION NETWORK

(75) Inventors: Wakako Maeda, Tokyo (JP); Akio Tajima, Tokyo (JP); Seigo Takahashi, Tokyo (JP); Akihiro Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 997 days.

(21) Appl. No.: 12/385,832

(22) Filed: Apr. 21, 2009

(65) Prior Publication Data

US 2009/0262942 A1  Oct. 22, 2009

(30) Foreign Application Priority Data

Apr. 22, 2008  (JP) .................................. 2008-111365

(51) Int. Cl.
*H04L 29/00* (2006.01)

(52) U.S. Cl.
USPC ............ 380/279; 380/277; 380/278; 713/153

(58) Field of Classification Search
USPC ........................... 380/277, 278, 279; 713/153
See application file for complete search history.

(56) References Cited

U.S. PATENT DOCUMENTS

| 6,026,163 | A  | * | 2/2000  | Micali ............................. 705/80 |
| 6,542,608 | B2 | * | 4/2003  | Scheidt et al. ................... 380/44 |
| 7,146,009 | B2 | * | 12/2006 | Andivahis et al. ............ 380/277 |
| 7,392,378 | B1 | * | 6/2008  | Elliott ............................ 713/153 |

FOREIGN PATENT DOCUMENTS

| JP | 2002-300158 | 10/2002 |
| JP | 2002-344438 | 11/2002 |

OTHER PUBLICATIONS

Ribordy, et al., "Automated 'plug & play' quantum key distribution", Electron. Lett., vol. 34, No. 22 pp. 2116-2117, (1998).
Bennett, et al., "Quantum Cryptography: Public Key Distribution and Coin Tossing", IEEE Int. Conf. on Computers, Systems, and Signal Processing, Bangalore, India, Dec. 10-12, 1984 pp. 175-179.
Townsend, et al., "Quantum cryptography on multiuser optical fibre networks", Nature vol. 385, Jan. 2, 1997 pp. 47-49.
Tanaka, et al., "Temperature independent QKD system using alternative-shifted phase modulation method", Proc. of ICOC 2004, Tu 4.5.3.
Kimura, et al., "Single-photon Interference over 150km Transmission Using Silica-based Integrated-optic Interferometers for Quantum Cryptography", Japanese Journal of Applied Physics Lett. vol. 43, No. 9A/B, 2004, pp. L1217-L1219.

(Continued)

*Primary Examiner* — Brandon Hoffman
*Assistant Examiner* — Michael D Anderson
(74) *Attorney, Agent, or Firm* — McGinn Intellectual Property Law Group, PLLC

(57) ABSTRACT

A method for managing shared random numbers in a secret communication network including at least one center node and a plurality of remote nodes connected to the center node, includes: sharing random number sequences between the center node and respective ones of the plurality of remote nodes; when performing random numbers sharing between a first remote node storing a first random number sequence shared with the center node and a second remote node storing a second random number sequence shared with the center node, distributing a part of the second random number sequence from the center node to the first remote node; and sharing the part of the second random number sequence between the first remote node and the second remote node.

25 Claims, 10 Drawing Sheets

(56) References Cited

OTHER PUBLICATIONS

Japanese Office Action dated Feb. 28, 2013, with partial English-language translation.

Wakako Maeda, et al., Secure Key Shearing between Remote Nodes on a Multiple Quantum Key Distribution, The Institute of Electronics, Information and Communication Engineers 2007 general conference lecture articles, Communication 2, Mar. 7, 2007, p. 421.

* cited by examiner

METHOD AND SYSTEM FOR MANAGING SHARED RANDOM NUMBERS IN SECRET COMMUNICATION NETWORK

BACKGROUND OF THE INVENTION

1. Field of the Invention

This application is based upon and claims the benefit of priority from Japanese Patent Application No. 2008-111365, filed on Apr. 22, 2008, the disclosure of which is incorporated herein in its entirety by reference.

The present invention relates to a secret communication network and, more particularly, to a method and system for managing shared random numbers such as a cryptographic key to be used between nodes.

2. Description of the Related Art

The Internet is an economic and social infrastructure over which various kinds of data are exchanged, and therefore it is an important issue to provide for preventive measures to protect data flowing over the network from risks of eavesdropping beforehand. A secret communication system, in which data for communication is encrypted, can be cited as one of the preventive measures. There are two broad types of cryptographic methods: common key cryptography and public key cryptography.

The common key cryptography is a method using a common key for both encryption and decryption, as typified by AES (Advanced Encryption Standard). This method enables high-speed processing and therefore is used to encrypt data itself.

The public key cryptography, on the other hand, is a method using a one-way function, as typified by the RSA (Rivest, Shamir, Adleman) encryption algorithm. According to this method, encryption is performed by using a public key, and decryption is performed by using a private key. This method is used to distribute a cryptographic key for the common key cryptography because it is not suitable for high-speed processing.

In secret communication that ensures secrecy by encrypting data, one of the important things to ensure secrecy is that encrypted data will not be broken even if the encrypted data is intercepted by an eavesdropper. Therefore, it is necessary that the same cryptographic key should not be consecutively used to encrypt data. This is because, if the same cryptographic key is consecutively used for encryption, the possibility is increased that the cryptographic key is estimated based on the increased amount of intercepted data.

Accordingly, it is required to update a cryptographic key shared between a sending side and a receiving side. When updating a key, it is absolutely necessary that the key to be updated should not be intercepted or broken. To this end, there are two broad types of methods: (1) a method by which a key is encrypted by means of public key encryption and then transmitted, and (2) a method by which a key is encrypted by using a master key, which is a common key preset for key update, and then transmitted (for example, see Japanese Patent Application Unexamined Publication Nos. 2002-344438 and 2002-300158). Security according to these methods depends on the fact that an enormous amount of calculation is required for cryptanalysis.

On the other hand, quantum key distribution (QKD) is a technology by which a cryptographic key is generated and shared between a sending side and a receiving side by the transmission of a single photon per bit, unlike ordinary optical communication (see Bennett, C. H., and Brassard, G., "QUANTUM CRYPTOGRAPHY: PUBLIC KEY DISTRIBUTION AND COIN TOSSING," IEEE International Conference on Computers, Systems, and Signal Processing, Bangalore, India, Dec. 10-12, 1984, pp. 175-179, and Ribordy, G., Gautier, J.-D., Gisin, N., Guinnard, O., and Zbinden, H., "Automated 'plug & play' quantum key distribution," Electronics Letters, 1998, Vol. 34, No. 22, pp. 2116-2117). This QKD technology ensures security not based on the amount of calculation as mentioned above but based on the quantum mechanics, and it has been proved that eavesdropping on the part of photon transmission is impossible. Moreover, not only proposals to realize one-to-one key generation and sharing, but also proposals have been made to realize key generation and sharing between one node and multiple nodes (hereinafter, referred to as one-to-many key generation and sharing), or key generation and sharing between multiple nodes and multiple nodes (hereinafter, referred to as many-to-many key generation and sharing), by using an optical switching technique and a passive optical branching technique (see Townsend, P. D., "Quantum cryptography on multiuser optical fibre Networks," Nature, Jan. 2, 1997, Vol. 385, pp. 47-49).

According to the QKD technology as described above, since original information for a cryptographic key is transmitted by being superimposed on each of single photons, it is possible to continue generating a cryptographic key as long as photon transmission is performed. For example, it is possible to generate several tens kilobits of final key per second.

Furthermore, perfectly secure cipher communication can be provided by using a cryptographic key generated by the QKD technology for a one-time pad (OTP) cipher, which has been proved to be unbreakable. When cipher communication is performed by using a OTP cipher, a cryptographic key is consumed as much as the quantity of data and is always discarded once it is used. For example, when a 1-Mbit file is OTP-encrypted, transmitted, and received, a 1-Mbit cryptographic key is consumed.

As described above, in a quantum cryptographic system in which cryptographic keys are generated and consumed in large quantities, it is indispensable to manage the cryptographic keys stored in storage media. In the QKD technology in particular, it is important to manage cryptographic keys among multiple nodes, in order to realize the expansion to one-to-many or many-to-many key generation and sharing by using an optical switching technique and/or a passive optical branching technique as proposed in Townsend cited above.

However, conventional technologies place importance only on the generation of shared information such as a cryptographic key, and the management of shared information even considering the consumption thereof has hardly been performed. As described above, the amount of a stored cryptographic key at each node is increased as key generation and sharing processes are performed, while the stored key is consumed and decreased in amount each time cipher communication is performed. In addition, key generation rates are not uniform among nodes in general because the key generation rate, at which a cryptographic key is generated through the key generation and sharing processes, depends also on the distance between nodes and the quality of communication. Therefore, the amount of a stored key at each node is increased/decreased from moment to moment. As the number of nodes increases, the management of cryptographic keys becomes more complicated.

Moreover, in a network having a center-remote structure like a one-to-many connection network, a cryptographic key is generated and shared between a center node and each remote node. Accordingly, since no cryptographic key is shared between remote nodes, cipher communication cannot be performed between remote nodes. Similarly, in a manyto-many connection network, although cipher communication can be performed between those nodes which perform key generation and sharing processes with each other, these nodes cannot perform cipher communication with other nodes because they do not share a cryptographic key with the other nodes.

When OTP cipher communication is performed in particular, a key once used for encryption cannot be used for decryption, unlike a case where a key with a fixed length is reused. Therefore, it is necessary to separately manage keys for encryption and keys for decryption. This necessity causes a new problem that the management is doubly complicated.

In addition, when a remote node joins or leaves a network in operation, key management in the entire network is affected, also causing a problem that the management is even more complicated.

SUMMARY OF THE INVENTION

Accordingly, an object of the present invention is to provide a method and system for managing shared random numbers by which random number sequences can be efficiently and securely shared between multiple nodes and also can be easily managed.

According to the present invention, a method for managing shared random numbers in a secret communication network including at least one center node and a plurality of remote nodes connected to the center node, includes: sharing random number sequences shared between the center node and respective ones of the plurality of remote nodes; when performing random numbers sharing between a first remote node storing a first random number sequence shared with the center node and a second remote node storing a second random number sequence shared with the center node, distributing a part of the second random number sequence from the center node to the first remote node; and sharing the part of the second random number sequence between the first remote node and the second remote node.

According to the present invention, a system for managing shared random numbers in a secret communication network including at least one center node and a plurality of remote nodes connected to the center node, wherein the center node comprises a first storage section for storing random number sequences shared between the center node and respective ones of the plurality of remote nodes, each of the plurality of remote nodes comprises: a second storage section for storing a random number sequence shared with the center node; and a third storage section for storing random number sequences shared with respective ones of other remote nodes, wherein when performing random numbers sharing between a first remote node storing a first random number sequence shared with the center node and a second remote node storing a second random number sequence shared with the center node, a part of the second random number sequence is distributed from the center node to the first remote node, so that the first remote node and the second remote node store the part of the second random number sequence into the third storage section of each of the first remote node and the second remote node.

According to the present invention, a secret communication network including at least one center node and a plurality of remote nodes connected to the center node, wherein the center node comprises: a first storage section for storing random number sequences shared between the center node and respective ones of the plurality of remote nodes; and a first controller controlling such that, when performing random numbers sharing between a first remote node and a second remote node, a part of a random number sequence shared with the second remote node is distributed to the first remote node, each of the plurality of remote nodes comprises: a second storage section for storing a random number sequence shared with the center node; a third storage section for storing random number sequences shared with respective ones of other remote nodes; and a second controller controlling such that, when performing random numbers sharing with the other remote node, a part of the random number sequence stored in the second storage section or a part of a random number sequence received from the center node is stored as a shared random number sequence in the third storage section.

According to the present invention, a center node connected to a plurality of remote nodes includes: a storage section for storing random number sequences shared between the center node and respective ones of the plurality of remote nodes; and a controller controlling such that, when performing random numbers sharing between a first remote node and a second remote node, a part of a random number sequence shared with the second remote node is distributed to the first remote node.

According to the present invention, a node connected to a center node which also connects other nodes, includes: a first storage section for storing a random number sequence shared with the center node; a second storage section for storing random number sequences shared with respective ones of other nodes with which the node communicates; and a controller controlling such that, when performing random numbers sharing with the other remote node, a part of the random number sequence stored in the first storage section or a part of a random number sequence received from the center node is stored as a shared random number sequence in the second storage section.

According to the present invention, random number sequences can be efficiently and securely shared between multiple nodes and also can be easily managed.

DETAILED DESCRIPTION OF THE PREFERRED EMBODIMENTS

The present invention is applicable to secret communication networks. In the exemplary embodiments and examples described below, shared random numbers are secret information to be shared between nodes. Hereinafter, taking a quantum key distribution network as an example of the secret communication networks, a detailed description will be given of a system that enables a random number sequence to be shared between nodes, making it possible for the nodes to perform cipher communication.

1. Exemplary Embodiment 1.1) Network Structure

Figure 1:
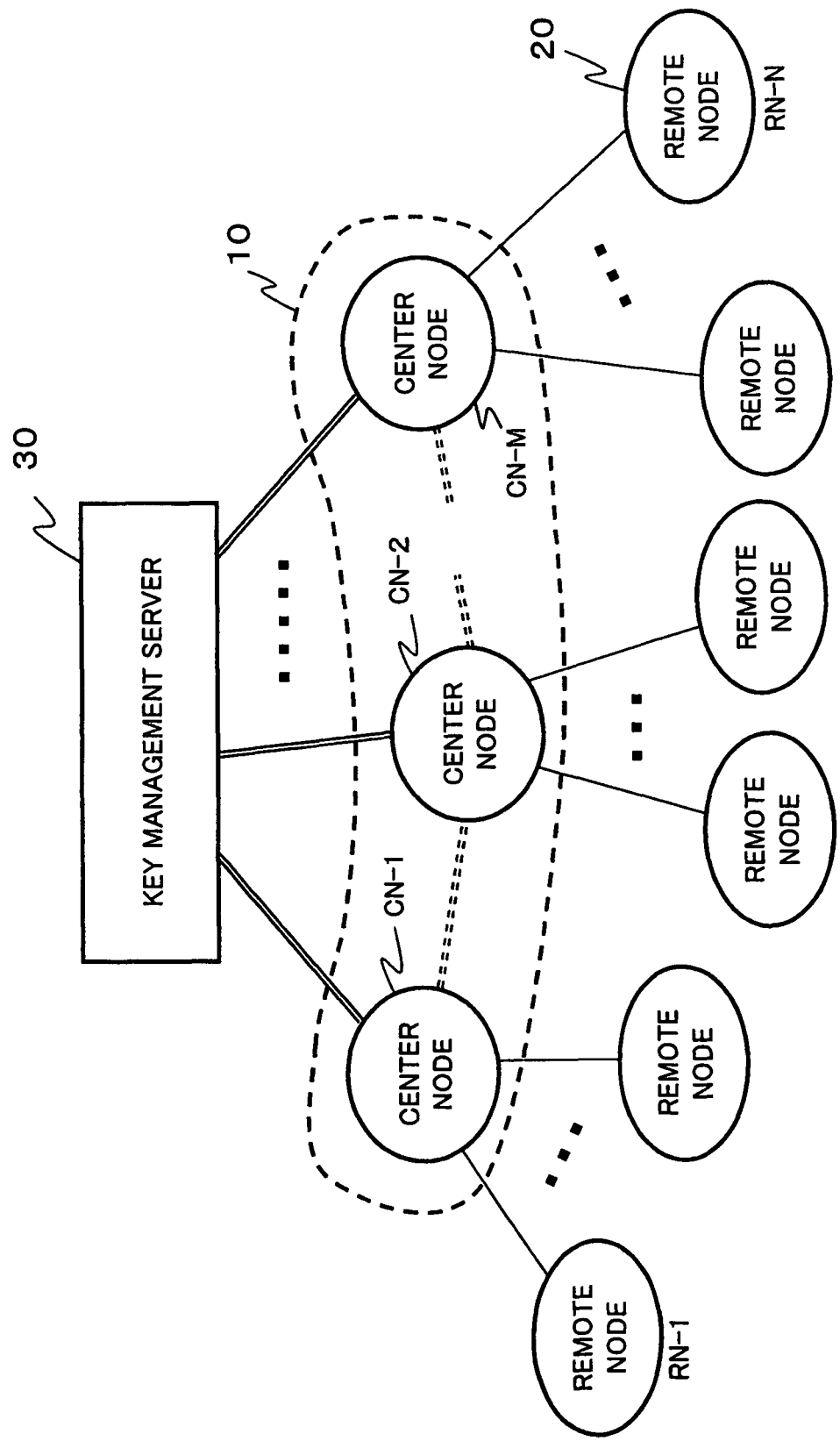
FIG. 1 is a network diagram showing a schematic structure of a secret communication network to which a shared random number management system according to an exemplary embodiment of the present invention is applied.

FIG. 1 is a network diagram showing a schematic structure of a secret communication network to which a shared random number management system according to an exemplary embodiment of the present invention is applied. Here, shown schematically is a quantum key distribution network structured as a 1:N network by including center nodes and remote nodes.

The quantum key distribution network includes a center node group 10 including a plurality of center nodes CN-1 to CN-M, a plurality of remote nodes RN-1 to RN-N each connected to one of the center nodes CN-1 to CN-M that the remote node belongs to, and a key management server 30 that manages cryptographic keys at each center node.

The center node group 10 is formed in such a manner that the center nodes CN-1 to CN-M are managed by the key management server 30, with each center node being securely connected to the key management server 30 through a closed communication channel (indicated by double solid lines in FIG. 1). Note that the key management server 30 may be incorporated in the center node group 10. For example, if the center nodes CN-1 to CN-M are securely connected to each other through closed communication channels (indicated by double broken lines in FIG. 1), the incorporation of a function similar to the key management server 30 into the center node group 10 can be accomplished by mutual communication between center nodes.

The structure of this quantum key distribution network can be recognized logically as a 1:N structure in which the multiple (N) remote nodes RN-1 to RN-N are connected to the center node group 10 which may be regarded as a single center node. Therefore, the actual physical network shown in FIG. 1 can be regarded as a group of 1:N networks. Accordingly, hereinafter, a description will be given of a case where the key management system according to the present exemplary embodiment is applied to a 1:N network including one center node and multiple remote nodes.

1.2) Key Management System

Figure 2:
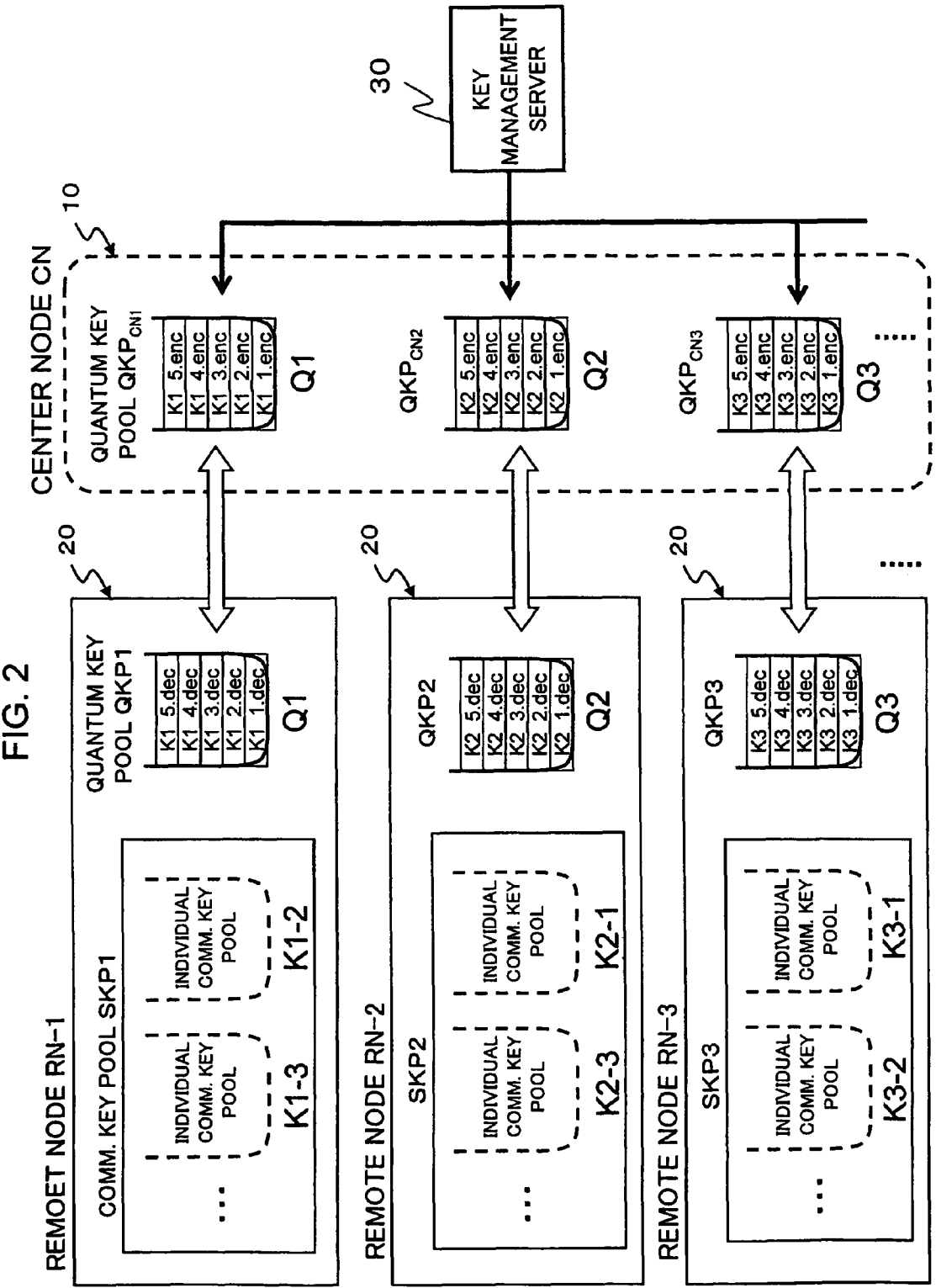
FIG. 2 is a schematic diagram for describing a schematic configuration of a key management system in a quantum key distribution network according to the present exemplary embodiment.

FIG. 2 is a schematic diagram for describing a schematic configuration of the key management system in the quantum key distribution network according to the present exemplary embodiment. The key management system includes a center node CN, N remote nodes RN-1 to RN-N, and a key management server 30.

It is assumed that a quantum key Q generated through a quantum key distribution process is shared between the center node CN and each remote node, as a first shared random number sequence. Each remote node is provided with a quantum key pool QKP, in which the quantum key Q shared with the center node CN is stored. For example, stored in the quantum key pool QKP1 at the remote node RN-1 is the quantum key Q1, associated with the identical quantum key Q1 in a corresponding quantum key pool $QKP_{CN1}$ at the center node CN.

Moreover, each remote node is provided with a communication key pool SKP, in which individual communication key pools K are set, provided for other remote nodes respectively with which OTP cipher communication is to be performed. Through an undermentioned procedure, a remote node shares a key (random number sequence) to use for communication with another remote node and stores the key in the individual communication key pool K provided for this another remote node. Thereby, cipher communication between the remote nodes can be performed. For example, when cipher communication is performed between the remote nodes RN-1 and RN-3, a key is stored in the individual communication key pool K1-3 at the remote node RN-1, and the same key is stored in the individual communication key pool K3-1 at the remote node RN-3. To generalize it, when cipher communication is performed between remote nodes RN-i and RN-j, a key is stored in the individual communication key pool Ki-j at the remote node RN-i, and the same key is stored in the individual communication key pool Kj-i at the remote node RN-j.

More specifically, since the quantum key Q at each remote node and the quantum key stored in a corresponding quantum key pool $QKP_{CN}$ at the center node CN are the same random number sequences, the contents of the quantum key pool QKP at each remote node are exactly the same as the contents of the corresponding quantum key pool $QKP_{CN}$ at the center node CN.

However, for convenience, it will be assumed hereinafter that quantum keys at the center node CN serve as encryption keys and quantum keys at the remote nodes serve as decryption keys, and that quantum keys are stored in files of a certain size (for example, 32 bytes or the like) and managed with a file number given to each file, as shown in FIG. 2. Incidentally, with respect to this storage and management on a file basis, a patent application was filed on Dec. 19, 2006 by the applicant of the present application (see Japanese Patent Application No. 2006-340750).

For example, an extension .enc is added to each key file in the quantum key pools $QKP_{CN}$ at the center node CN, with file numbers given to the key files in order of generation, so that the names of the key files in the quantum key pool $QKP_{CN}$ corresponding to the remote node RN-1, for example, are K1_1.*enc*, K1_2.*enc*, and so on.

Similarly, an extension .dec is added to each key file in, for example, the quantum key pool QKP1 at the remote node RN-1, with file numbers given to the key files in order of generation, so that the names of the key files are K1_1.*dec*, K1_2.*dec*, and so on. Note, however, that .enc and .dec are mere extensions of convenience. Therefore, the file K1_1.*enc* and the file K1_1.*dec*, for example, are substantially the same random number sequences.

In the following description, operations for remote nodes to securely share a key for use in cipher communication between the remote nodes will be referred to as "key distribution." One of specific examples thereof is one-time pad (OTP) key distribution. A communication key shared between remote nodes through this key distribution will be referred to also as "logically secure key."

1.3) Key Sharing Between Remote Nodes

Figure 3:
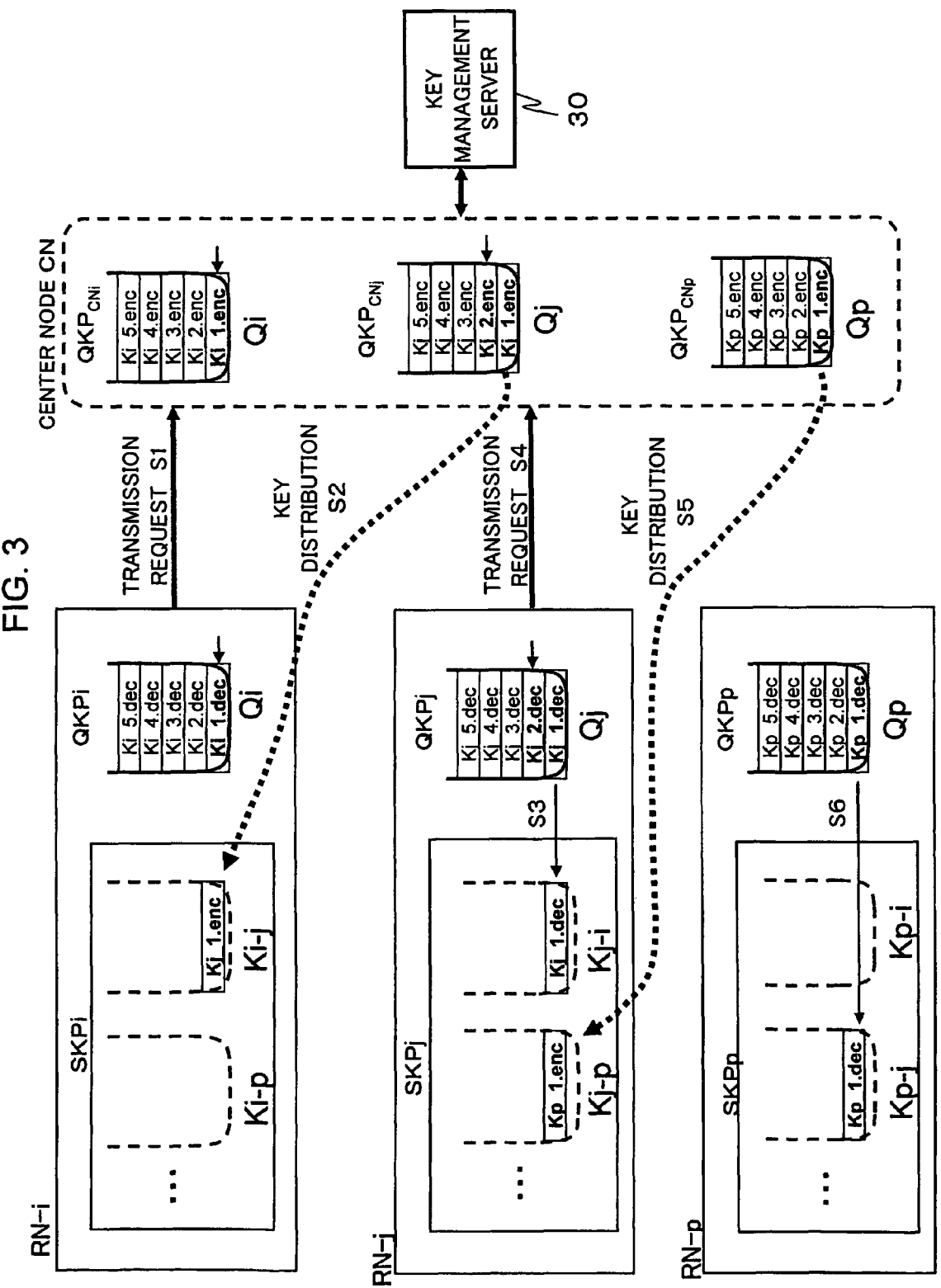
FIG. 3 is a schematic diagram for describing a key sharing procedure in the key management system shown in FIG. 2.

FIG. 3 is a schematic diagram for describing a key sharing procedure in the key management system shown in FIG. 2. Here, a description will be given of a process for sharing keys among three remote nodes RN-i, RN-j, and RN-p (i, j, p are arbitrary natural numbers not greater than N).

First, it is assumed that the remote node RN-i requests the key management server 30 to provide for data transmission to the remote node RN-j (transmission request S1). The key management server 30 controls the quantum key pools $QKP_{CNi}$ and $QKP_{CNj}$ corresponding to the source (RN-i) and destination (RN-j) of data transmission according to the transmission request S1, respectively, so that a key file Kj_1.*enc* in the quantum key pool $QKP_{CNj}$ corresponding to the destination is sent to the individual communication key pool Ki-j at the source remote node RN-i (key distribution S2). In this event, the key file Kj_1.*enc* to be distributed is encrypted using a key file Ki_1.*enc* in the quantum key pool $QKP_{CNi}$ corresponding to the source and, at the remote node RN-i, is decrypted using an identical key file Ki_1.*dec* in the quantum key pool $QKP_i$, which will be described later.

Simultaneously, at the destination remote node RN-j, a key file Kj_1.*dec* in the quantum key pool $QKP_j$ is transferred into the individual communication key pool Kj-i (transfer S3).

As described above, since the key file Kj_1.*enc* in the quantum key pool $QKP_{CNj}$ at the center node CN is the same as the key file Kj_1.*dec* in the quantum key pool $QKP_j$ at the remote node RN-j, it can be said that the same logically secure keys have been stored in the individual communication key pool Ki-j at the sending-side remote node RN-i and in the individual communication key pool Kj-i at the receiving-side remote node RN-j, respectively. These logically secure keys are the same random number sequences, as described above.

Similarly, when the remote node RN-j requests the key management sever 30 to provide for data transmission to the remote node RN-p (transmission request S4), the key management server 30 distributes a key file Kp_1.*enc* in the quantum key pool $QKP_{CNp}$ corresponding to the destination of data transmission according to the transmission request S4 to the individual communication key pool Kj-p at the source remote node RN-j (key distribution S5). In this event, the key file Kp_1.*enc* to be distributed is encrypted using a key file Kj_2.*enc* in the quantum key pool $QKP_{CNj}$ corresponding to the source and, at the remote node RN-j, is decrypted using an identical key file Kj_2.*dec* in the quantum key pool $QKP_j$, which will be described later.

Simultaneously, at the destination remote node RN-p, a key file Kp_1.*dec* in the quantum key pool $QKP_p$ is transferred into the individual communication key pool Kp-j (transfer S6). Consequently, the same logically secure keys are stored in the individual communication key pool Kj-p at the sending-side remote node RN-j and in the individual communication key pool Kp-j at the remote node RN-p, respectively.

Thus, the remote node RN-i can encrypt data for transmission by using the key file Kj_1.*enc* (logically secure key), and the remote node RN-j can decrypt the received encrypted data by using the identical key file Kj_1.*dec* (logically secure key). Moreover, the remote node RN-j can encrypt data for transmission by using the key file Kp_1.*enc* (logically secure key), and the remote node RN-p can decrypt the received encrypted data by using the identical key file Kp_1.*dec* (logically secure key).

1.4) Key Distribution and Key Consumption

Figure 4:
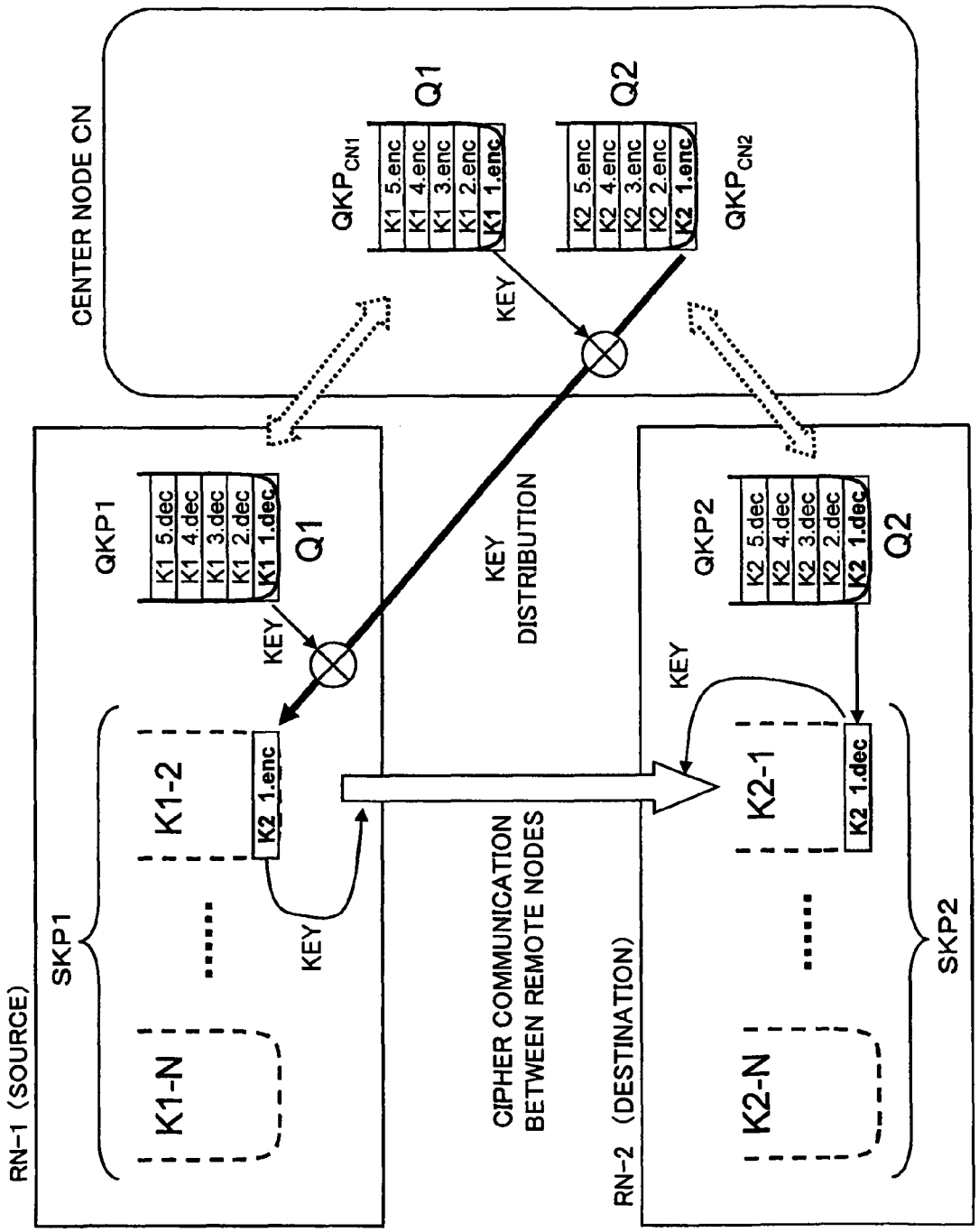
FIG. 4 is a schematic diagram for describing a key distribution procedure in the key management system shown in FIG. 2.

FIG. 4 is a schematic diagram for describing a key distribution procedure in the key management system shown in FIG. 2. Here, to avoid complicating description, a description will be given of key distribution in a case where data transmission is made from the remote node RN-1 to the remote node RN-2.

When the remote node RN-1 requests the key management server 30 to provide for data transmission to the remote node RN-2, the center node CN, as described above, reads out a key file K2_1.*enc* from the quantum key pool $QKP_{CN2}$ corresponding to the destination of data transmission, encrypts the key file K2_1.*enc* by using a key file K1_1.*enc* in the quantum key pool $QKP_{CN1}$ corresponding to the source of data transmission, and transmits this encrypted quantum key K2_1.*enc* along with the file number of the encryption key to the source remote node RN-1.

The remote node RN-1 reads out a key file K1_1.*dec* having the same file number as the notified one from the quantum key pool QKP1, which stores the same quantum key Q1 as the one stored in the quantum key pool $QKP_{CN1}$ at the center node CN. The remote node RN-1 decrypts the received key file K2_1.*enc* by using the key file K1_1.*dec* and stores the key file K2_1.*enc* in the individual communication key pool K1-2 as a logically secure key.

On the other hand, the remote node RN-2 is notified from the center node CN of the file number of the distributed key file K2_1.*enc*. The remote node RN-2 reads out a key file K2_1.*dec* having the same file number from the quantum key pool QKP2 and stores the key file K2_1.*dec* in the individual communication key pool K2-1 as a logically secure key.

Thus, the same logically secure keys are stored in the individual communication key pool K1-2 at the sending-side remote node RN-1 and in the individual communication key pool K2-1 at the receiving-side remote node RN-2, respectively. Moreover, in this process of key distribution and sharing, the key files K1_1.*enc* and K1_1.*dec* in the quantum key pools $QKP_{CN1}$ and QKP1 are consumed in the process involved with the sending side, and the key files K2_1.*enc* and K2_1.*dec* in the quantum key pools $QKP_{CN2}$ and QKP2 are similarly consumed in the process involved with the receiving side. Accordingly, for example, even if a data transmission from the remote node RN-1 to the remote node RN-2 is made more frequently, quantum keys on both of the sending and receiving sides are equally consumed, irrespective of encryption key or decryption key. Therefore, no imbalance occurs in the amounts of keys.

1.5) Effects

As described above, according to the present exemplary embodiment, in a network in which a quantum key is shared between a center node and each remote node, the management of encryption keys and decryption keys between remote nodes can be greatly simplified by securely distributing an encryption key to a remote node, assuming that the quantum keys at the center node serve as encryption keys (or decryption keys) and the quantum keys at the remote nodes serve as decryption keys (or encryption keys).

For example, even if the amounts of communication are asymmetric between remote nodes performing OTP cipher communication, it is possible to efficiently share an encryption key or a decryption key.

Moreover, communication key pools for individually storing logically secure keys are provided according to the number of remote nodes, whereby keys can be easily managed in the same manner regardless of the number of remote nodes.

Furthermore, a join or leave of a remote node into/from the network can be handled only by increasing/reducing the individual communication key pools. Accordingly, a change in the network can also be made easily.

2. First Example

2.1) Configuration

Figure 5:
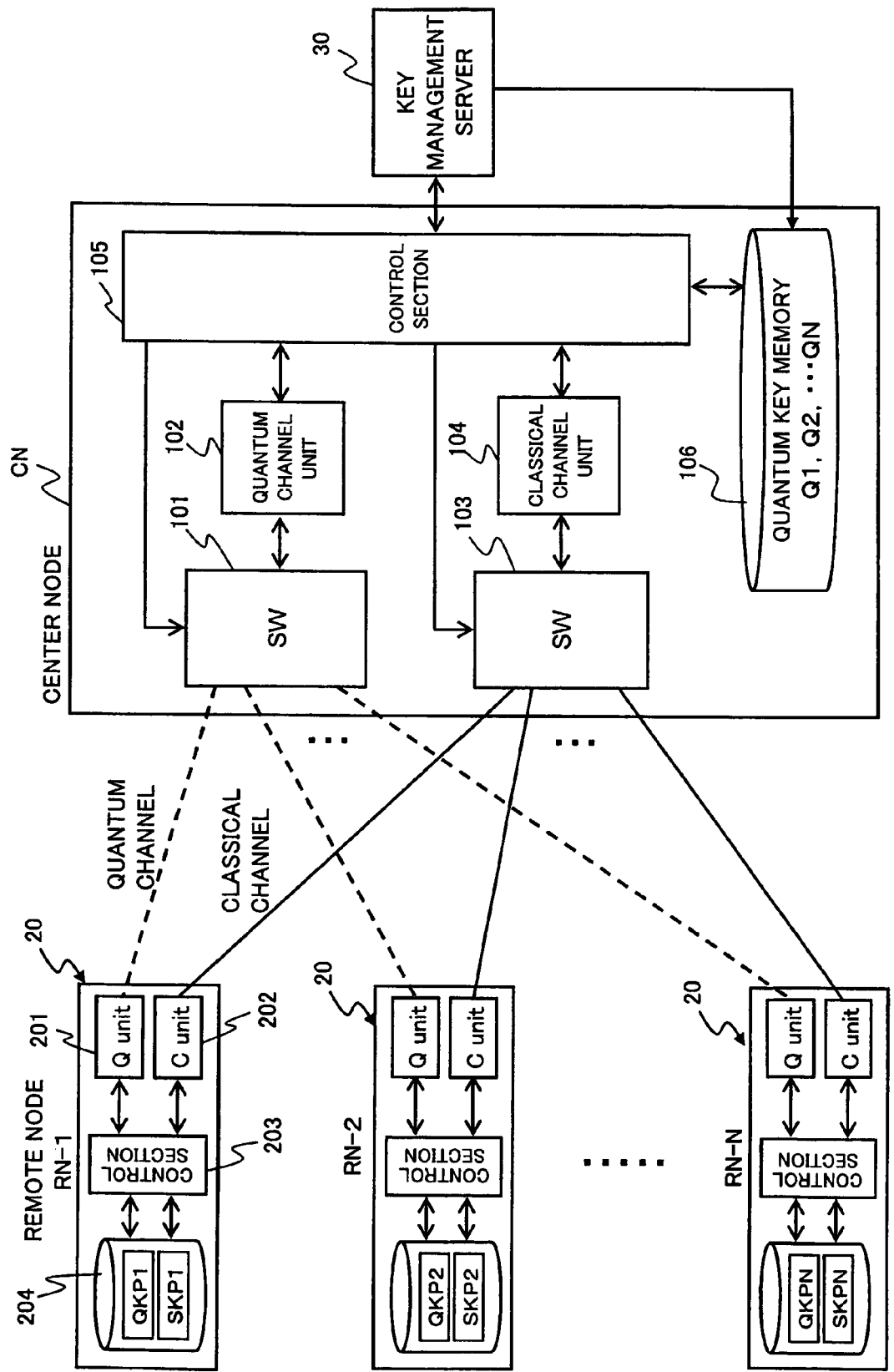
FIG. 5 is a block diagram showing a schematic configuration and structure of a quantum key distribution network according to a first example of the present invention.

FIG. 5 is a block diagram showing a schematic configuration and structure of a quantum key distribution network according to a first example of the present invention. Here, shown is selected part of the network shown in FIG. 1, in which each of N remote nodes RN-1 to RN-N is connected to a center node CN through optical fiber, and the generation and sharing of a quantum key, as well as cipher communication using the quantum key, are performed between each remote node RN-i and the center node CN.

The remote nodes RN-1 to RN-N have similar configurations, each including a quantum channel unit 201, a classical channel unit 202, a control section 203 controlling these units, and a key memory 204 for storing keys.

The respective key memories 204 of the remote nodes RN-1 to RN-N are provided with quantum key pools QKP1 to QKPN, respectively, in which quantum keys Q1, Q2, ..., QN generated and shared between each remote node RN-i and the center node CN are stored, respectively. Moreover, the key memories 204 are also provided with communication key pools SKP1 to SKPN, respectively, in each of which, for each remote node, a logically secure key for use in one-time pad (OTP) cipher communication between remote nodes is stored on demand. For example, in the communication key pool SKP1 at the remote node RN-1, an individual communication key pool K1-2 used for communication with the remote node RN-2 is set.

The control section 203 performs the generation of shared random numbers with the center node CN, encryption/decryption using the shared random numbers, and the like. The control section 203 may be a program-controlled processor, in which case the above-described shared random number generation function and encryption/decryption function can be implemented by executing programs read from a memory (not shown).

The center node CN includes a quantum channel switch section 101, a quantum channel unit 102, a classical channel switch section 103, a classical channel unit 104, a control section 105 controlling these sections and units, and a quantum key memory 106 for storing keys. The quantum key memory 106 of the center node CN is provided with quantum key pools $QKP_{CN1}$ to $QKP_{CNN}$, in which shared random number sequences Q1, Q2, ..., QN shared with the remote nodes RN-1 to RN-N, respectively, are stored, respectively. The control section 105 performs the generation of shared random numbers with each remote node, switching control of the switch sections 101 and 103, encryption/decryption using the shared random numbers, monitoring of the amount of each key stored in the quantum key memory 106.

The quantum channel unit 201 of each remote node and the quantum channel unit 102 of the center node CN generate a random number sequence to be shared between the nodes in question by the transmission of a very weak optical signal at a single-photon level or lower through a quantum channel and the switch section 101. Moreover, the classical channel unit 202 of each remote node and the classical channel unit 104 of the center node CN transmit/receive data and a file number for generating and sharing a random number sequence through a classical channel and the switch section 103, and also transmit/receive data encrypted based on the shared random number sequence through the classical channel and the switch section 103.

The control section 105 can connect a quantum channel between the center node CN and a selected one of the remote nodes RN-1 to RN-N to the quantum channel unit 102 by controlling the switch section 101. Independently of this quantum channel switching control, the control section 105 can connect a classical channel between the center node CN and a selected one of the remote nodes RN-1 to RN-N to the classical channel unit 104 by controlling the switch section 103.

The key management server 30 monitors the quantum key memory 106 of the center node CN. In the example shown in FIG. 5, since there is only one center node, the key management server 30 monitors the quantum key memory 106 of the center node CN only.

Each remote node RN-i stores a generated random number sequence in the quantum key pool QKPi of the key memory 204. The center node CN stores all random number sequences respectively generated with the remote nodes RN-1 to RN-N in the quantum key memory 106. Since the center node CN keeps track of all the quantum keys shared with the remote nodes under its control in this manner, it is sufficient for the key management server 30 to monitor only the quantum key memory 106 of the center node CN.

Incidentally, it is sufficient that a quantum channel and a classical channel can be discriminated as different channels. The quantum channel is a channel used to generate a quantum key, and the classical channel is a channel for the communication in the ordinary optical power region and is used to transmit data for generating shared random numbers and to transmit encrypted data. Although the quantum channel transmits an optical signal in a very weak state of power equivalent to one photon per bit or fewer from a sender (conventionally referred to as "Alice") to a receiver (conventionally referred to as "Bob"), the quantum channel can also transmit an optical signal of the optical power used in ordinary optical communication.

Moreover, in the present example, a quantum channel and a classical channel are multiplexed. However, the multiplexing scheme is not particularly specified. If a wavelength division multiplexing scheme is used, it is sufficient to make a configuration such that a signal of the quantum channel wavelength is demultiplexed to be input to the switch section 101 and a signal of the classical channel wavelength is demultiplexed to be input to the switch section 103, with a wavelength multiplexing/demultiplexing section provided before the switch sections 101 and 103 correspondingly to each remote node.

2.2) Quantum Key Generation

The control section 105 of the center node CN and the control section 203 of each remote node RN-i control the overall operation of their respective own nodes. Here, however, the key generation function will be described in particular. The control sections 105 and 203 carry out a predetermined key generation sequence, whereby a random number sequence is shared between the center node CN and each remote node RN-i. As a typical example, the control sections 105 and 203 carry out the BB84 protocol (see Bennett, C. H., and Brassard, G., "QUANTUM CRYPTOGRAPHY: PUBLIC KEY DISTRIBUTION AND COIN TOSSING" IEEE International Conference on Computers, Systems, and Signal Processing, Bangalore, India, Dec. 10-12, 1984, pp. 175-179), as well as error detection, error correction, and privacy amplification, thereby generating and sharing a key. As an example, a description will be given of a case of generating a random number sequence for the quantum key Q1 to be shared between the center node CN and the remote node RN-1.

First, the quantum channel unit 201 of the remote node RN-1 and the quantum channel unit 102 of the center node CN carry out single-photon transmission through a quantum channel. The quantum channel unit 102 of the center node CN performs photon detection and outputs the result of this detection to the control section 105. Based on the result of the photon detection, the control sections 105 and 203 of these nodes in question carry out processing for basis reconciliation, error correction, and privacy amplification through a classical channel. At the center node CN, a shared random number sequence Q1 thus shared is stored in the quantum key memory 106, associated with the remote node RN-1. Shared random number sequences Q2 to QN to be shared with the other remote nodes RN-2 to RN-N, respectively, are also generated sequentially through similar processes.

Any of the quantum channel unit 201 of the remote node RN-1 and the quantum channel unit 102 of the center node CN may serve as any of Alice (the sender of a very weak optical signal) and Bob (the receiver of the very weak optical signal). However, since Bob includes a photon detector, it is preferable that Bob is deployed in the center node CN, from the viewpoint of power consumption and monitoring control.

Next, as an example, a detailed description will be given of a case where the present example is applied to a QKD system in which quantum key distribution is performed by using a plug and play scheme for the quantum channel units.

Figure 6:
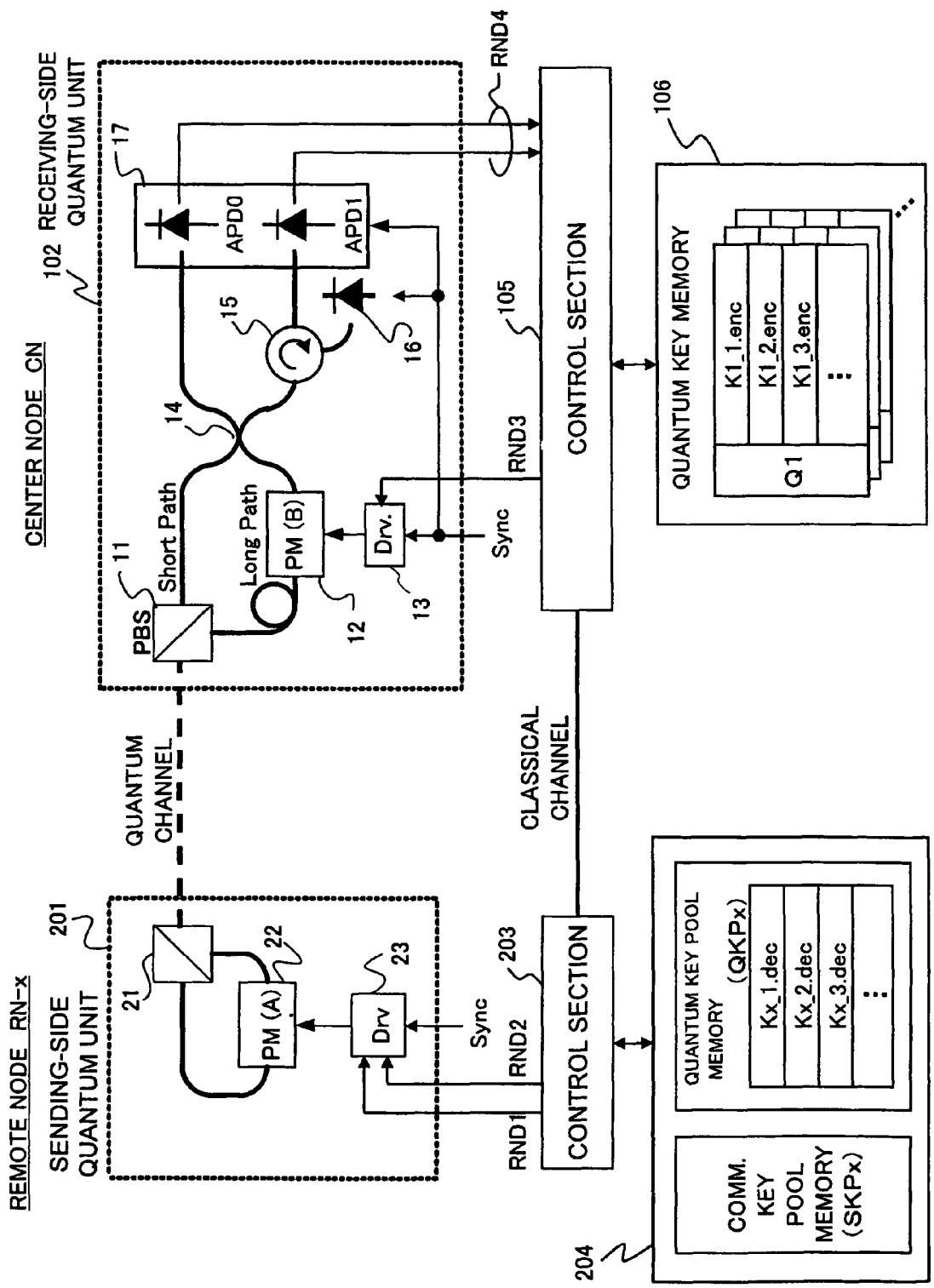
FIG. 6 is a block diagram showing an example of a plug and play QKD system to which the present example is applied.

FIG. 6 is a block diagram showing an example of a plug and play QKD system to which the present example is applied. Here, it is assumed that the center node CN and an arbitrary remote node RN-x are connected through an optical fiber transmission line. Shown here are an example of the quantum channel unit 201 on Alice's side (the remote node side) and an example of the quantum channel unit 102 on Bob's side (the center node side). The quantum channel unit system in this example is based on an alternative-shifted phase modulation plug and play method (see Ribordy, G., Gautier, J., Gisin, N., Guinnard, O., and Zbinden, H., "Automated 'plug & play' quantum key distribution" Electronics Letter, Vol. 34, No. 22 (1998), pp. 2116-2117, and Tanaka, A., Tomita, A., Tajima, A., Takeuchi, T., Takahashi, S., and Nambu, Y., "Temperature independent QKD system using alternative-shifted phase modulation method" in Proceedings of ECOC 2004, Tu.4.5.3.) In this example, the sending-side quantum channel unit 201 includes a polarization beam splitter (PBS) 21, a phase modulation section 22, and a random number generation section 23, and is connected to the optical fiber transmission line. The phase modulation section 22 and polarization beam splitter (PBS) 21 constitute a PBS loop. The PBS loop has a function similar to a Faraday mirror, outputting incident light with its polarization state rotated by 90 degrees (see Tanaka et al.)

The phase modulation section 22 performs phase modulation on a series of passing optical pulses, in accordance with a clock signal supplied from the classical channel unit. Four depths of phase modulation (0, π/2, π, 3π/2) are used here, which correspond to four possible combinations of random numbers RND1 and random numbers RND2 supplied from the random number generation section 23. A phase modulation is performed at the timing of an optical pulse's passing through the phase modulation section 22.

The receiving-side quantum channel unit 102 includes a polarization beam splitter (PBS) 11, a phase modulation section 12, a random number generation section 13, an optical coupler 14, an optical circulator 15, a photon detector 17, and a pulse light source 16, and is connected to the optical fiber transmission line. An optical pulse P generated by the pulse light source 16 in accordance with a clock signal supplied from the classical channel unit is led by the optical circulator 15 to the optical coupler 14, where the optical pulse P is split into two parts. One of the two parts, an optical pulse P1, is sent to the PBS 11 by traveling along a short path. The other part, an optical pulse P2, is sent to the PBS 11 after passing through the phase modulation section 12 provided in a long path. These optical pulses P1 and P2 are combined at the PBS 11 and then transmitted as double pulses to the quantum channel unit 201 on the sending-side through the optical fiber transmission line.

In the sending-side quantum channel unit 201, the double pulses P1 and P2 arriving through the optical fiber transmission line are each further split into two parts, resulting in quartet pulses, that is, four pulses composed of two clockwise double pulses $P1_{CW}$ and $P2_{CW}$ and counterclockwise double pulses $P1_{CCW}$ and $P2_{CCW}$. The clockwise double pulses $P1_{CW}$ and $P2_{CW}$ and counterclockwise double pulses $P1_{CCW}$ and $P2_{CCW}$ pass through the phase modulation section 22 in the opposite directions. Each pair enters a PBS port on the opposite side to the port from which the pair were output.

The phase modulation section 22 performs phase modulation on the following pulse $P2_{CW}$ of the clockwise double pulses with respect to the preceding pulse $P1_{CW}$ and also gives a phase difference of π between the counterclockwise double pulses and the clockwise double pulses. The quartet pulses thus phase-modulated as required are combined again at the PBS 21 to return to double pulses. The output double pulses will be represented by P1 and $P2^{*a}$ since only the following pulse is phase-modulated according to transmission information as described above. At the time of output, the polarization of the output pulses has been rotated by 90 degrees with respect to the polarization at the time of input into the PBS loop. Consequently, an effect equivalent to that obtained by a Faraday mirror can be achieved.

Since the polarization of the optical pulses P1 and $P2^{*a}$ received from the quantum channel unit 201 has been rotated by 90 degrees, the PBS 11 of the receiving-side quantum channel unit 102 leads each of these received pulses into the different path than the path the pulse used at the time of transmission to the sending-side. Specifically, the received optical pulse P1 travels along the long path and is subjected at the phase modulation section 12 to phase modulation according to a random number RND2 supplied from the random number generation section 13, resulting in a phase-modulated optical pulse $P1^{*b}$ arriving at the optical coupler 14. On the other hand, the optical pulse $P2^{*a}$ passes along the short path, which is different from the path the optical pulse P2 used at the time of transmission to the sending-side, and then arrives at the same optical coupler 14.

The optical pulse $P2^{*a}$ thus phase-modulated at the quantum channel unit 201 and the optical pulse $P1^{*b}$ thus phase-modulated at the quantum channel unit 102 interfere with each other, and the result of this interference is detected by the photon detector 17. The photon detector 17 is driven in the Geiger mode in accordance with a clock signal supplied from the classical channel unit and is thereby capable of high-sensitivity reception of a photon. Photon transmission is performed by the quantum channel units 201 and 102 as described above.

According to the present example, the control section 203 of the remote node RN-x and the control section 105 of the center node CN synchronize to each other through a classical channel. The sending-side quantum channel unit 201 transmits original information in frame units to the receiving-side quantum channel unit 102. Based on the information that the receiving-side quantum channel unit 102 has successfully received, random numbers to be shared between the remote node RN-x and the center node CN are sequentially generated in file units of a predetermined size. The random number sequences thus matched to each other in file units are further associated with each other through the classical channel and then stored in a quantum key pool memory of the key memory 204 at the remote node RN-x and in the quantum key memory 106 at the center node CN, respectively.

In systems in which a sender and a receiver independently generate cryptographic keys like the QKD technology system shown in FIG. 6, it is guaranteed that the keys substantially concurrently generated by the sender and the receiver are the same random number sequences. By subjecting the thus generated cryptographic keys to sharing processing by association as described above, it is possible to achieve the sharing of a cryptographic key between a sender and a receiver.

2.3) Key Management

Next, a description will be given of a key management method used when a logically secure key is shared between remote nodes by performing OTP key distribution.

First, of the N remote nodes, a node that is the source of encrypted data issues a request for a destination's logically secure key to the key management server 30. The shared logically secure key is stored in an individual communication key pool as an encryption key at the source, and as a decryption key at the destination, individually. Hereinafter, a procedure of sharing logically secure keys in a case where N (the number of nodes)=3 will be described in more detail with reference to FIGS. 7 to 9. It is assumed that FIGS. 7 to 9, in this order, follow events sequentially taking place.

Figure 7:
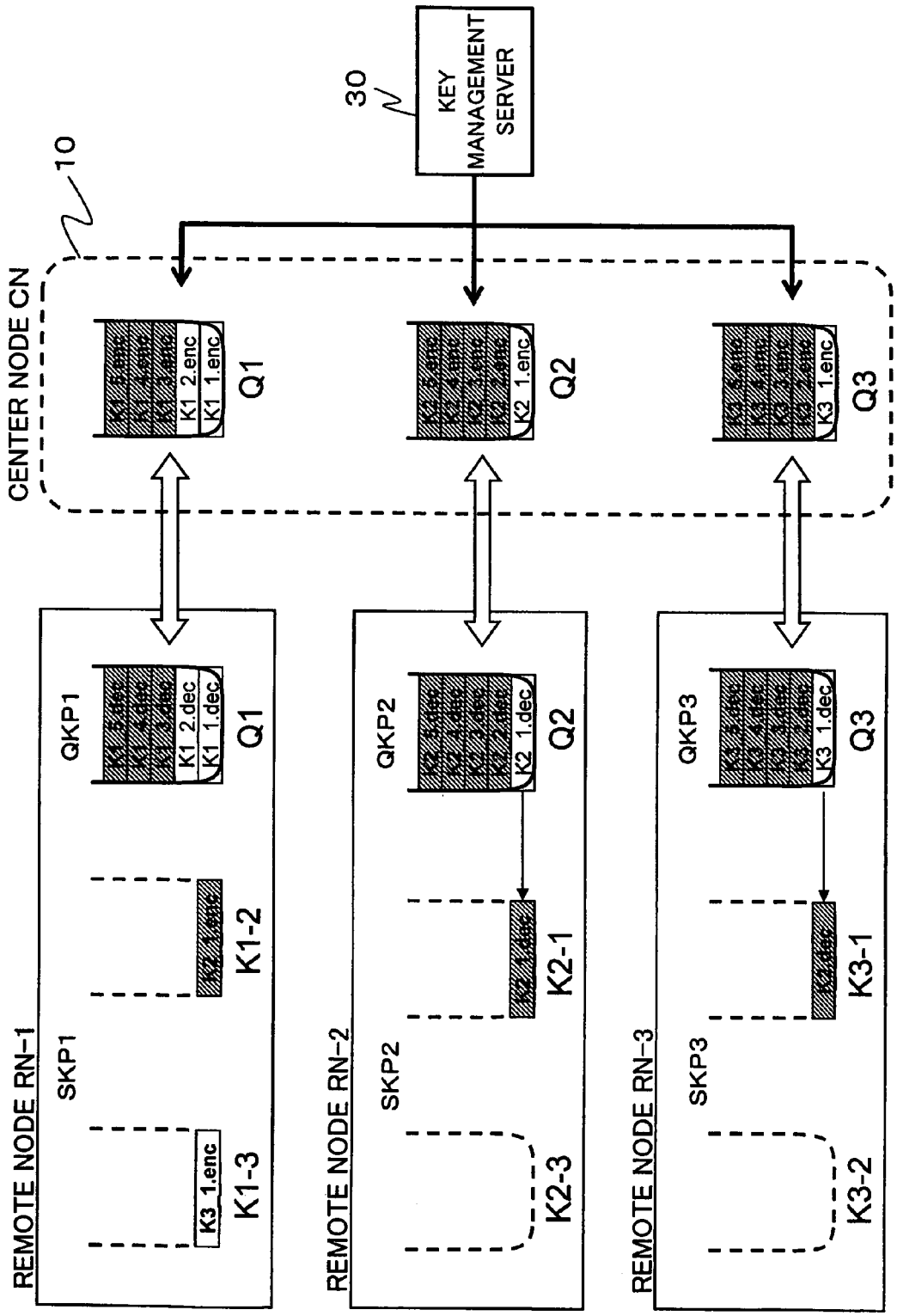
FIG. 7 is a schematic diagram showing a procedure of sharing logically secure keys used for a remote node RN-1 to transmit encrypted data to remote nodes NR-2 and RN-3.

FIG. 7 is a schematic diagram showing a procedure of sharing logically secure keys used for the remote node RN-1 to transmit encrypted data to the remote nodes NR-2 and RN-3. Upon receipt of a request from the remote node RN-1 for a key to encrypt a communication with the remote node RN-2, the key management server 30 instructs the center node CN to transmit a key file K2_1.*enc* of the quantum key Q2 to the source of the request. More specifically, the key file K2_1.*enc* is OTP-encrypted by using a key file K1_1.*enc* of the quantum key Q1 and then transmitted to the remote node RN-1.

The remote node RN-1 decrypts the key file K2_1.*enc* by using a key file K1_1.*dec* of the quantum key Q1 and stores the key file K2_1.*enc* in an individual communication key pool K1-2. Moreover, the remote node RN-2, which is the destination, relocates a key file K2_1.*dec* of the quantum key Q2 into the individual communication key pool K2-1 as a decryption key. Similarly, in the sharing of a logically secure key for a communication from the remote node RN-1 to the remote node RN-3, a key file K3_1.*enc* (encryption key) of the quantum key Q3 is distributed from the center node CN to the remote node RN-1. Due to OTP encryption performed at this time of distribution, key files K1_2.*enc* and K1_2.*dec* of the quantum key Q1 are consumed. At the remote node RN-3, a key file K3_1.*dec* (decryption key) of the quantum key Q3 is relocated into the individual communication key pool K3-1.

In this manner, the logically secure keys for the remote node RN-1 to transmit encrypted data to the remote nodes RN-2 and RN-3 respectively are shared and stored in the respective individual communication key pools.

Figure 8:
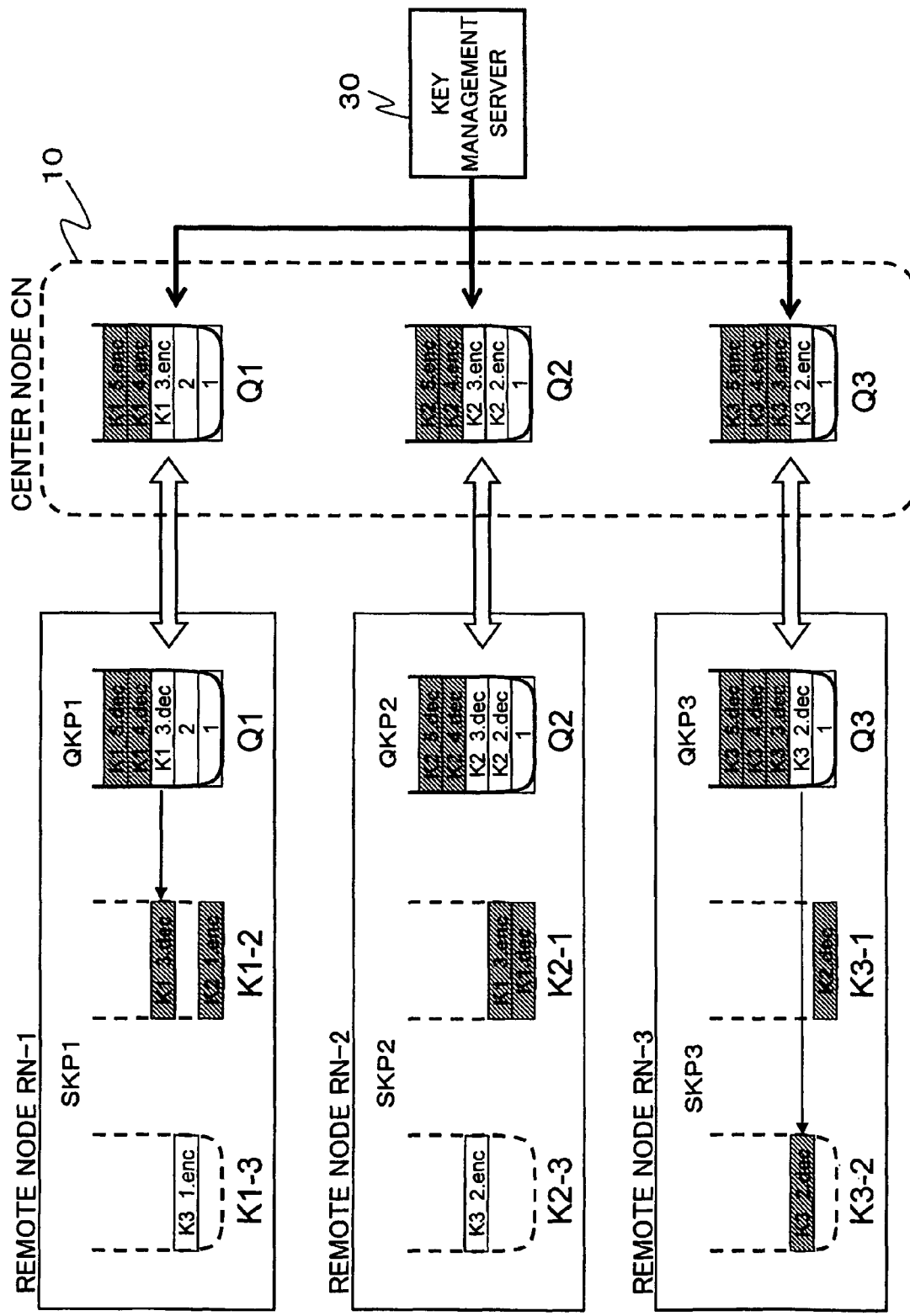
FIG. 8 is a schematic diagram showing a procedure of sharing logically secure keys used for the remote node RN-2 to transmit encrypted data to the remote nodes RN-1 and RN-3.

FIG. 8 is a schematic diagram showing a procedure of sharing logically secure keys used for the remote node RN-2 to transmit encrypted data to the remote nodes RN-1 and RN-3. Upon receipt of a request from the remote node RN-2 for a key to encrypt a communication to the remote node RN-1, the key management server 30 instructs the center node CN to transmit a key file K1_3.*enc* of the quantum key Q1 to the source of the request, the remote node RN-2 OTP-encrypting the key file K1_3.*enc* by using a key file K2_2.*enc* of the quantum key Q2.

The remote node RN-2 decrypts the OTP-encrypted key file K1_3.*enc* by using a key file K2_2.*dec* of the quantum key Q2 and stores the key file K1_3.*enc* in the individual communication key pool K2-1. The remote node RN-1 relocates a key file K1_3.*dec* of the quantum key Q1 into the individual communication key pool K1-2 as a decryption key.

Similarly, in the sharing of a logically secure key for a communication from the remote node RN-2 to the remote node RN-3, a key file K3_2.*enc* (encryption key) of the quantum key Q3 is distributed from the center node CN to the remote node RN-2. Due to OTP encryption performed at this time of distribution, key files K2_3.*enc* and K2_3.*dec* of the quantum key Q2 are consumed. At the remote node RN-3, a key file K3_2.*dec* (decryption key) of the quantum key Q3 is relocated into the individual communication key pool K3-2.

In this manner, the logically secure keys for the remote node RN-2 to transmit encrypted data to the remote nodes RN-1 and RN-3 respectively are shared and stored in the respective individual communication key pools.

Figure 9:
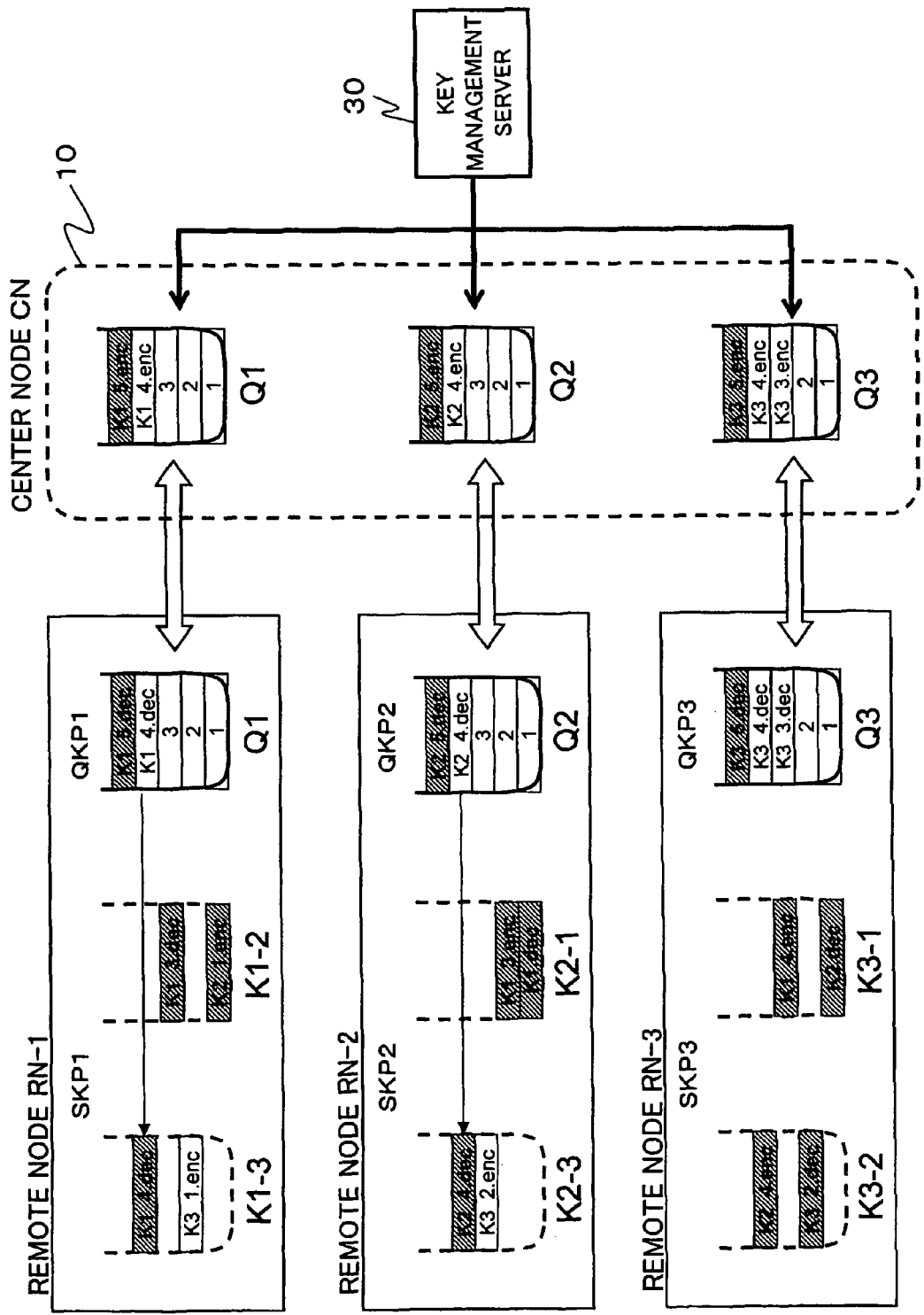
FIG. 9 is a schematic diagram showing a procedure of sharing logically secure keys used for the remote node RN-3 to transmit encrypted data to the remote nodes RN-1 and RN-2.

FIG. 9 is a schematic diagram showing a procedure of sharing logically secure keys used for the remote node RN-3 to transmit encrypted data to the remote nodes RN-1 and RN-2. Upon receipt of a request from the remote node RN-3 for a key to encrypt a communication to the remote node RN-1, the key management server 30 instructs the center node CN to transmit a key file K1_4.*enc* of the quantum key Q1 to the source of the request, the remote node RN-3 OTP-encrypting the key file K1_4.*enc* by using a key file K3_3.*enc* of the quantum key Q3.

The remote node RN-3 decrypts the key file K1_4.*enc* by using a key file K3_3.*dec* of the quantum key Q3 and stores the key file K1_4.*enc* in the individual communication key pool K3-1. The remote node RN-1 relocates a key file K1_4.*dec* of the quantum key Q1 into the individual communication key pool K1-3 as a decryption key.

Similarly, in the sharing of a logically secure key for a communication from the remote node RN-3 to the remote node RN-2, a key file K2_4.*enc* (encryption key) of the quantum key Q2 is distributed from the center node CN to the remote node RN-3. Due to OTP encryption performed at this time of distribution, key files K3_4.*enc* and K3_4.*dec* of the quantum key Q3 are consumed. At the remote node RN-2, a key file K2_4.*dec* (decryption key) of the quantum key Q2 is relocated into the individual communication key pool K2-3.

In this manner, the logically secure keys for the remote node RN-3 to transmit encrypted data to the remote nodes RN-1 and RN-2 respectively are shared and stored in the respective individual communication key pools.

2.4) Effects

As described above, when remote nodes (for example, the remote nodes RN-1 and RN-2) perform OTP cipher communication, it is sufficient that the remote node RN-1 performs encryption by using an enc file in the individual communication key pool K1-2 and that the remote node RN-2 performs decryption by using a corresponding dec file in the individual communication key pool K2-1.

Reversely, when the remote node RN-2 performs encryption, it is sufficient that the remote node RN-2 performs encryption by using an enc file in the individual communication key pool K2-1 and that the remote node RN-1 performs decryption by using a corresponding dec file in the individual communication key pool K1-2. Accordingly, even if the amounts of communication between remote nodes performing cipher communication are asymmetric, it is possible to efficiently share a key for OTP cipher communication.

The same applies to OTP cipher communication between the remote nodes RN-2 and RN-3 and between the remote nodes RN-1 and RN-3. In this manner, in a quantum key distribution network, an encryption key and a decryption key for OTP cipher communication can be securely shared and easily managed.

3. Second Example

Figure 10:
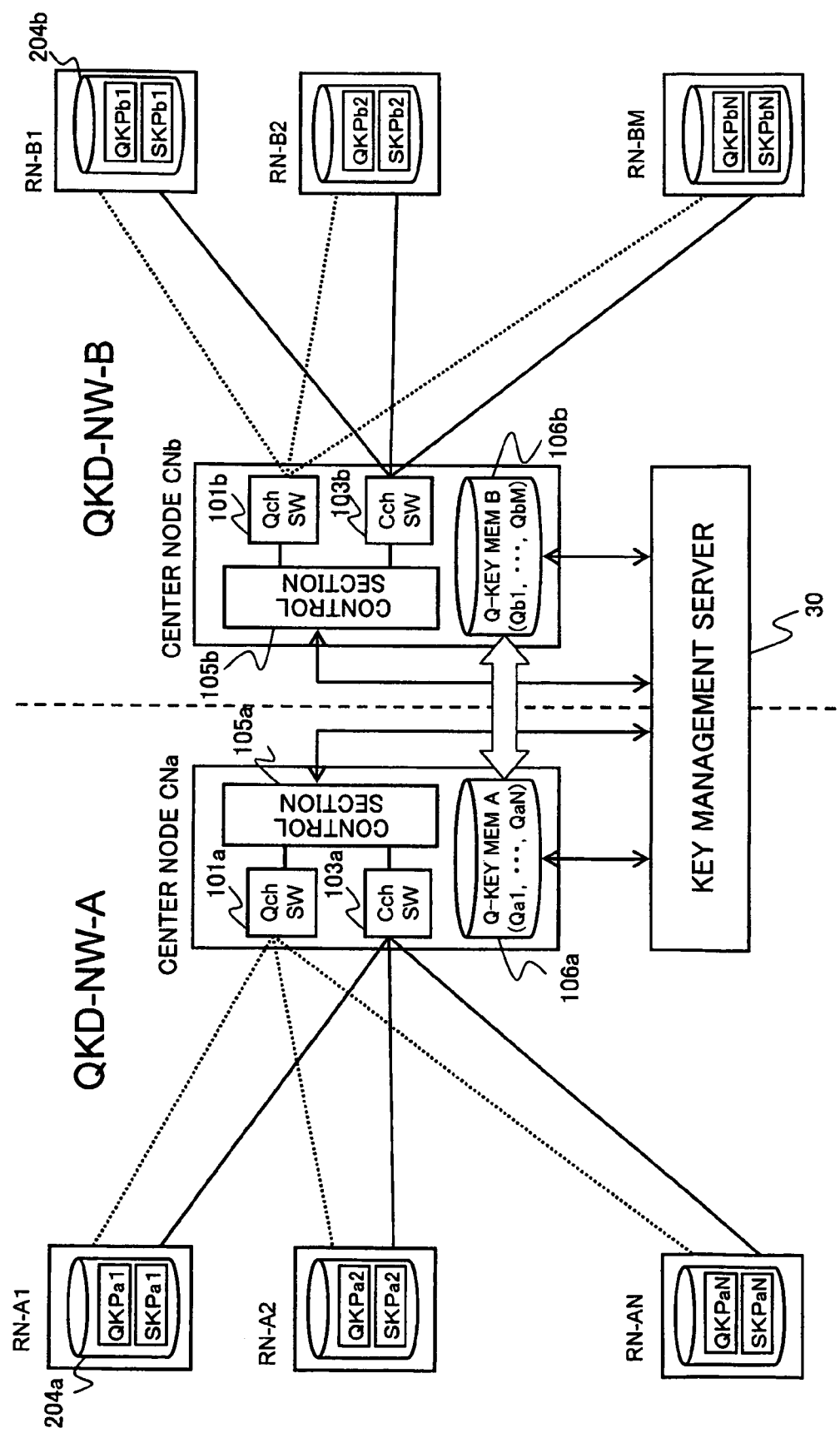
FIG. 10 is a block diagram showing a schematic configuration and structure of a secret communication network according to a second example of the present invention.

FIG. 10 is a block diagram showing a schematic configuration of a secret communication network according to a second example of the present invention. Here, shown is selected part of the network shown in FIG. 1. With respect to a QKD network A (QKD-NW-A), N remote nodes and a center node constitute a 1:N network. Each of the N remote nodes RN-A1 to RN-AN is connected to the center node CNa through optical fiber, and the generation and sharing of a cryptographic key, as well as cipher communication using the cryptographic key, are performed between each remote node and the center node CNa.

The configurations of each remote node RN-A and the center node CNa are similar to those shown in FIG. 5. In FIG. 10, for simplification, the quantum channel units and classical channel units as well as the control sections of the remote nodes are omitted.

On the other hand, with respect to a QKD network B (QKD-NW-B), M remote nodes and a center node constitute a 1:M network. Each of the M remote nodes RN-B1 to RN-BM is connected to the center node CNb through optical fiber, and the generation and sharing of a cryptographic key, as well as cipher communication using the cryptographic key, are performed between each remote node and the center node CNb. The configurations of each remote node RN-B and the center node CNb are similar to those shown in FIG. 5. In FIG. 10, for simplification, the quantum channel units and classical channel units as well as the control sections of the remote nodes are omitted.

The quantum key memory 106a of the center node CNa and the quantum key memory 106b of the center node CNb can securely exchange a quantum key. For example, it is assumed that the center nodes CNa and CNb are installed in the same data center, are present on a closed network, and are therefore secure in terms of device installment and management even without particularly performing cipher communication.

The key management server 30 monitors the respective quantum key memories 106a and 106b of the center nodes CNa and CNb.

At each remote node, a generated random number sequence is stored in the key memory 204a or 204b. At the center node CNa, all random number sequences generated with the remote nodes RN-A1 to RN-AN are stored in the quantum key memory 106a. At the center node CNb, all random number sequences generated with the remote nodes RN-B1 to RN-BM are stored in the quantum key memory 106b.

As described above, since each center node CN keeps track of all quantum keys at the remote nodes under its jurisdiction, it is sufficient for the key management server 30 to monitor only the quantum key memories of the center nodes CN. Depending on the amounts of the remaining quantum keys in each of the quantum key memories of the center nodes CN, the key management server 30 sends an instruction to the control section 105a or 105b to control the quantum channel switch section 101a or 101b, whereby a quantum key between intended nodes can be preferentially generated.

Incidentally, assuming that N (the number of remote nodes in the QKD-NW-A)=2 and that M (the number of remote nodes in the QKD-NW-B)=1, logically secure keys can be shared between the three remote nodes by OTP key distribution as in the above-described first example.

Note that the quantum key distribution technology may be of any type, such as plug and play type, one-way type, or differential phase shift type. The quantum key distribution protocol is not limited to the BB84 protocol but may be the B92 or E91 protocol. The present invention is not intended to be limited to these types and protocols mentioned above.

The present invention can be applied to one-to-many and many-to-many secret information communication using a shared cryptographic key distribution technology typified by the quantum key distribution (QKD) technology.

The present invention may be embodied in other specific forms without departing from the spirit or essential characteristics thereof. The above-described exemplary embodiment and examples are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. A method for managing shared random numbers in a secret communication network including at least one center node and a plurality of remote nodes connected to the center node, the method comprising:
    securely sharing symmetric random number sequences between the center node and respective ones of the plurality of remote nodes;
    when performing random numbers sharing between a first remote node storing a first random number sequence which comprises one of the symmetric random number sequences and a second remote node storing a second random number sequence which comprises another one of the symmetric random number sequences, distributing securely a part of the second random number sequence from the center node to the first remote node; and
    sharing securely the part of the second random number sequence between the first remote node and the second remote node,
    wherein the symmetric random number sequences between the center node and respective ones of the plurality of remote nodes are generated by quantum key distribution systems formed between the center node and the respective ones of the plurality of remote nodes.

2. The method according to claim 1, wherein the part of the second random number sequence is distributed by:
    the center node encrypting the part of the second random number sequence shared with the second remote node by using a part of the first random number sequence shared with the first remote node; and
    the first remote node receiving encrypted part of the second random number sequence and then decrypting the encrypted part of the second random number sequence by using the part of the first random number sequence.

3. The method according to claim 1, wherein each of the plurality of remote nodes further stores a part of a random number sequence for use in communication with each of other remote nodes, and wherein the random number sequence is shared between the center node and a corresponding one of the other remote nodes.

4. The method according to claim 2, wherein each of the plurality of remote nodes further stores a part of a random number sequence for use in communication with each of other remote nodes, and wherein the random number sequence is shared between the center node and a corresponding one of the other remote nodes.

5. The method according to claim 3, wherein the part of the random number sequence comprises an encryption key or a decryption key for use in communication with the corresponding one of the other remote nodes.

6. The method according to claim 4, wherein the part of the random number sequence comprises an encryption key or a decryption key for use in communication with the corresponding one of the other remote nodes.

7. A system for managing shared random numbers in a secret communication network including at least one center node and a plurality of remote nodes connected to the center node, wherein the center node comprises a first storage section for storing symmetric random number sequences shared between the center node and respective ones of the plurality of remote nodes, and each of the plurality of remote nodes comprises:
a second storage section for storing a random number sequence shared with the center node; and
a third storage section for storing random number sequences shared with respective ones of other remote nodes, and wherein when performing random numbers securely sharing between a first remote node storing a first random number sequence which comprises one of the symmetric random number sequences and a second remote node storing a second random number sequence which comprises another one of the symmetric random number sequences, a part of the second random number sequence is securely distributed from the center node to the first remote node, so that the first remote node and the second remote node store the part of the second random number sequence into the third storage section of each of the first remote node and the second remote node.

8. The system according to claim 7, wherein the part of the second random number sequence is distributed by:
the center node encrypting the part of the second random number sequence shared with the second remote node by using a part of the first random number sequence shared with the first remote node; and
the first remote node receiving encrypted part of the second random number sequence from the center node and then decrypting the encrypted part of the second random number sequence by using the part of the first random number sequence.

9. The system according to claim 7, wherein each of the plurality of remote nodes further stores a part of the random number sequence, which is stored in the third storage section and is used to communicate with each of other remote nodes, and wherein the random number sequence stored in the third storage section is shared between the center node and a corresponding one of the other remote nodes.

10. The system according to claim 8, wherein each of the plurality of remote nodes further stores a part of the random number sequence, which is stored in the third storage section and is used to communicate with each of other remote nodes, and wherein the random number sequence stored in the third storage section is shared between the center node and a corresponding one of the other remote nodes.

11. The system according to claim 9, wherein the part of the random number sequence stored in the third storage section comprises an encryption key or a decryption key for use in communication with the corresponding one of the other remote nodes.

12. The system according to claim 10, wherein the part of the random number sequence stored in the third storage section comprises an encryption key or a decryption key for use in communication with the corresponding one of the other remote nodes.

13. The system according to claim 7, wherein the symmetric random number sequences shared between the center node and the respective ones of the plurality of remote nodes are generated by quantum key distribution systems formed between the center node and the respective ones of the plurality of remote nodes.

14. A secret communication network including at least one center node and a plurality of remote nodes connected to the center node, wherein the center node comprises:
a first storage section for storing symmetric random number sequences securely shared between the center node and respective ones of the plurality of remote nodes; and
a first controller controlling such that, when performing random numbers securely sharing between a first remote node and a second remote node, a part of a random number sequence securely shared with the second remote node is securely distributed to the first remote node, and each of the plurality of remote nodes comprises:
a second storage section for storing a random number sequence which comprises a corresponding one of the symmetric random number sequences;
a third storage section for storing random number sequences securely shared with respective ones of other remote nodes; and
a second controller controlling such that, when performing random numbers securely sharing with the other remote node, a part of the random number sequence stored in the second storage section or a part of a random number sequence received from the center node is stored as a securely shared random number sequence in the third storage section.

15. The secret communication network according to claim 14, wherein the third storage section stores the shared random number sequence for use in communication with the other remote node.

16. The secret communication network according to claim 14, wherein
the first controller of the center node encrypts the part of the random number sequence shared with the second remote node by using a part of a random number sequence shared with the first remote node and transmits an encrypted part of the random number sequence shared with the second remote node to the first remote node; and
the second controller of the first remote node, when receiving the encrypted part of the random number sequence from the center node, decrypts the encrypted part of the random number sequence by using the part of the random number sequence which is shared with the center node and is stored in the second storage section.

17. The secret communication network according to claim 15, wherein
the first controller of the center node encrypts the part of the random number sequence shared with the second remote node by using a part of a random number sequence shared with the first remote node and transmits an encrypted part of the random number sequence shared with the second remote node to the first remote node; and
the second controller of the first remote node, when receiving the encrypted part of the random number sequence from the center node, decrypts the encrypted part of the random number sequence by using the part of the random number sequence which is shared with the center node and is stored in the second storage section.

18. A center node connected to a plurality of remote nodes, the center node comprising:
a storage section for storing symmetric random number sequences securely shared between the center node and respective ones of the plurality of remote nodes; and
a controller controlling such that, when performing random numbers securely sharing between a first remote node and a second remote node, a part of a random number sequence securely shared with the second remote node is securely distributed to the first remote node,
wherein the random number of sequence securely shared with the second remote node comprises a corresponding one of the symmetric random number sequences.

19. The center node according to claim 18, wherein the controller encrypts the part of the random number sequence shared with the second remote node by using a part of a random number sequence shared with the first remote node and transmits an encrypted part of the random number sequence shared with the second remote node to the first remote node.

20. A node connected to a center node which also connects other nodes, the node comprising:
a first storage section for storing a symmetric random number sequence securely shared with the center node;
a second storage section for storing random number sequences securely shared with respective ones of other nodes with which the node communicates; and
a controller controlling such that, when performing random numbers securely sharing with the other remote node, a part of the symmetric random number sequence stored in the first storage section or a part of a random number sequence received from the center node is stored as a securely shared random number sequence in the second storage section.

21. The node according to claim 20, wherein the second storage section stores a shared random number sequence for use in communication with each node with which the node communicates.

22. The node according to claim 20, wherein the center node encrypts a part of a random number sequence shared with the other node by using a part of the random number sequence shared with the node and transmits an encrypted part of the random number sequence shared with the other node to the node, and
wherein when receiving the encrypted part of the random number sequence, the controller decrypts the encrypted part of the random number sequence by using the part of the random number sequence stored in the first storage section.

23. The node according to claim 21, wherein the center node encrypts a part of a random number sequence shared with the other node by using a part of the random number sequence shared with the node and transmits an encrypted part of the random number sequence shared with the other node to the node, and
wherein when receiving the encrypted part of the random number sequence, the controller decrypts the encrypted part of the random number sequence by using the part of the random number sequence stored in the first storage section.

24. A computer program instructing a computer to function as a center node connected to a plurality of remote nodes, comprising:
storing symmetric random number sequences securely shared between the center node and respective ones of the plurality of remote nodes in a storage section; and
when performing random numbers securely sharing between a first remote node and a second remote node, securely distributing a part of a random number sequence securely shared with the second remote node to the first remote node,
wherein the random number sequence securely shared with the second remote node comprises a corresponding one of the symmetric random number sequences.

25. A computer program instructing a computer to function as a node connected to a center node which also connects other nodes, comprising:
storing a symmetric random number sequence securely shared with the center node in a first storage section;
storing random number sequences securely shared with respective ones of other nodes with which the node communicates; and
when performing random numbers securely sharing with the other remote node, storing a part of the symmetric random number sequence stored in the first storage section or a part of a random number sequence received from the center node as a securely shared random number sequence in the second storage section.

* * * * *